United States Patent
Li

(10) Patent No.: US 10,997,019 B1
(45) Date of Patent: May 4, 2021

(54) SYSTEM AND METHOD FOR FACILITATING HIGH-CAPACITY SYSTEM MEMORY ADAPTIVE TO HIGH-ERROR-RATE AND LOW-ENDURANCE MEDIA

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 22 days.

(21) Appl. No.: 16/670,680

(22) Filed: Oct. 31, 2019

(51) Int. Cl.
*G06F 11/10* (2006.01)
*G06F 11/07* (2006.01)
*G06F 12/02* (2006.01)

(52) U.S. Cl.
CPC ........ *G06F 11/1044* (2013.01); *G06F 11/073* (2013.01); *G06F 11/1068* (2013.01); *G06F 11/1072* (2013.01); *G06F 12/0207* (2013.01); *G06F 2212/7201* (2013.01)

(58) Field of Classification Search
CPC ............ G06F 11/1044; G06F 11/1072; G06F 11/1068; G06F 11/073; G06F 12/0207; G06F 2212/7201
See application file for complete search history.

(56) References Cited

U.S. PATENT DOCUMENTS

| | | | |
|---|---|---|---|
| 6,148,377 A | 11/2000 | Carter | |
| 10,114,563 B2 * | 10/2018 | Thomas | G06F 12/023 |
| 10,235,198 B2 | 3/2019 | Qiu | |
| 2011/0055471 A1 | 3/2011 | Thatcher | |
| 2011/0099418 A1 | 4/2011 | Chen | |
| 2011/0145542 A1 * | 6/2011 | Morrow | G06F 12/1036 711/207 |
| 2011/0161784 A1 | 6/2011 | Selinger | |
| 2013/0080391 A1 | 3/2013 | Raichstein | |
| 2014/0082273 A1 | 3/2014 | Segev | |
| 2015/0100753 A1 * | 4/2015 | Shen | G06F 12/1036 711/207 |
| 2015/0301964 A1 | 10/2015 | Brinicombe | |
| 2015/0363271 A1 | 12/2015 | Haustein | |

(Continued)

FOREIGN PATENT DOCUMENTS

WO 9418634 8/1994

*Primary Examiner* — Thien Nguyen
(74) *Attorney, Agent, or Firm* — Shun Yao; Park, Vaughan, Fleming & Dowler LLP

(57) ABSTRACT

The system receives a request to write a first piece of data to a non-volatile memory. The system encodes, based on an error correction code (ECC), the first piece of data to obtain a first ECC codeword which includes a plurality of ordered parts and a first parity. The system writes the plurality of ordered parts in multiple rows. The system writes the first parity to a same row in which a starting ordered part is written. The system updates, in a data structure, entries associated with the ordered parts. A respective entry indicates: a virtual address associated with a respective ordered part, a physical address at which the respective ordered part is written, and an index corresponding to a virtual address associated with a next ordered part. A first entry associated with the starting ordered part further indicates a physical address at which the first parity is written.

20 Claims, 11 Drawing Sheets

(56) References Cited

U.S. PATENT DOCUMENTS

2017/0147499 A1  5/2017  Mohan
2018/0107591 A1  4/2018  Smith
2019/0205206 A1  7/2019  Hornung

* cited by examiner

SYSTEM AND METHOD FOR FACILITATING HIGH-CAPACITY SYSTEM MEMORY ADAPTIVE TO HIGH-ERROR-RATE AND LOW-ENDURANCE MEDIA

BACKGROUND

Field

This disclosure is generally related to the field of data storage. More specifically, this disclosure is related to a system and method for facilitating high-capacity system memory adaptive to high-error-rate and low-endurance media.

Related Art

Current performance-critical applications continue to require a large amount of data loaded in the system memory for fast access. However, extending the memory (e.g., to a random access memory or RAM) to properly serve these applications can be limited by the current storage density of dynamic random access memory (DRAM). For example, a current DRAM dual in-line memory module (DIMM) (volatile memory) can have a maximum capacity of 256 Gigabytes (GB), while a storage drive such as a solid state drive (SSD) (non-volatile memory) with similar dimensions as the DRAM DIMM can have a maximum capacity of 4 Terabytes (TB). This imbalance—specifically, the limited capacity of system memory—can result in frequent page swapping between the system memory and the storage drive, which in turn can slow down processing and reduce the effectiveness and efficiency of the overall system performance.

One current system for data placement is the Apache Pass (AEP) memory system, which uses the Intel-specific double data rate (DDR)-T protocol to handle the media timing. However, the AEP memory system has several limitations, including: a specific CPU; a limited number of memory slots; overprovisioning of unnecessary CPU and system resources; a black box due to the specific processor and the DDR-T protocol; and a high write amplification, as described below in relation to FIG. 1.

SUMMARY

One embodiment provides a system and method for facilitating data placement. During operation, the system receives a request to write a first piece of data to a non-volatile memory. The system encodes, based on an error correction code (ECC), the first piece of data to obtain a first ECC codeword which includes a plurality of ordered parts and a first parity. The system writes the plurality of ordered parts in multiple rows of the non-volatile memory. The system writes the first parity to a same row in which a starting ordered part is written. The system updates, in a data structure, entries associated with the ordered parts. A respective entry indicates: a virtual address associated with a respective ordered part, a physical address at which the respective ordered part is written, and an index corresponding to a virtual address associated with a next ordered part. A first entry associated with the starting ordered part further indicates a physical address at which the first parity is written.

In some embodiments, the system writes the plurality of ordered parts by: the system determines that at least one of the plurality of ordered parts comprises updated data associated with former data previously written to a first row of the multiple rows; the system writes the at least one of the plurality of ordered parts directly to a same physical location at which the former data is previously written; and the system refrains from copying out any valid parts of the first row to a new row.

In some embodiments, writing the first parity to the same row in which the first ordered part is written comprises replacing a former parity in the same row.

In some embodiments, virtual addresses associated with the ordered parts of the first piece of data are not consecutive.

In some embodiments, the system receives a request to write a second piece of data to the non-volatile memory. The system writes the second piece of data to the non-volatile memory. The second piece of data comprises updated data associated with former data previously written to the non-volatile memory, and the second piece of data comprises a plurality of parts.

In some embodiments, the system writes the second piece of data by: the system marks the former data as expired; the system identifies a first row with a number of valid parts less than a predetermined number; the system writes a third piece of data to a new row, wherein the third piece of data comprises the valid parts of the identified first row and the plurality of parts of the second piece of data; the system encodes, based on the error correction code (ECC), the third piece of data to obtain a second ECC codeword which includes a second parity; and the system writes the second parity to the new row.

In some embodiments, the system receives a request to read a portion of the first piece of data from the non-volatile memory. The system obtains the plurality of ordered parts of the first piece of data from the non-volatile memory by searching the data structure based on an initial virtual address for a respective ordered part associated with the portion of the first piece of data and for the first entry. The system obtains, from the first entry, the first parity based on the physical address at which the first parity is written. The system processes the obtained plurality of ordered parts and the obtained first parity to obtain the first ECC codeword. The system decodes, based on the error correction code (ECC), the first ECC codeword to obtain the first piece of data. The system returns the requested portion of the first piece of data.

In some embodiments, the system processes the obtained plurality of ordered parts and the obtained first parity to obtain the first ECC codeword by: the system truncates, from the first entry, the physical address at which the starting ordered part is written to obtain the physical address at which the first parity is written; the system reshuffles the plurality of ordered parts and the obtained first parity; and the system concatenates the reshuffled plurality of ordered parts and the obtained first parity to obtain the first ECC codeword.

In some embodiments, the system obtains the plurality of ordered parts of the first piece of data from the non-volatile memory by: system determines an initial virtual address for a respective ordered part associated with the portion of the first piece of data; the system performs, in the data structure, a first search for an initial entry based on the initial virtual address, wherein the initial entry indicates: a first physical address at which the respective ordered part is written, and a first index corresponding to a virtual address associated with a next ordered part; the system reads the respective ordered part from the first physical address; and the system performs, in the data structure, a second search for a next entry based on the first index to obtain a second physical address at which the next ordered part is written and from which to read the next ordered part.

In some embodiments, obtaining the first parity from the first entry further comprises calculating the physical address at which the first parity is written by truncating the physical address at which the starting ordered part is written.

BRIEF DESCRIPTION OF THE FIGURES

In the figures, like reference numerals refer to the same figure elements.

DETAILED DESCRIPTION

Figure 1:
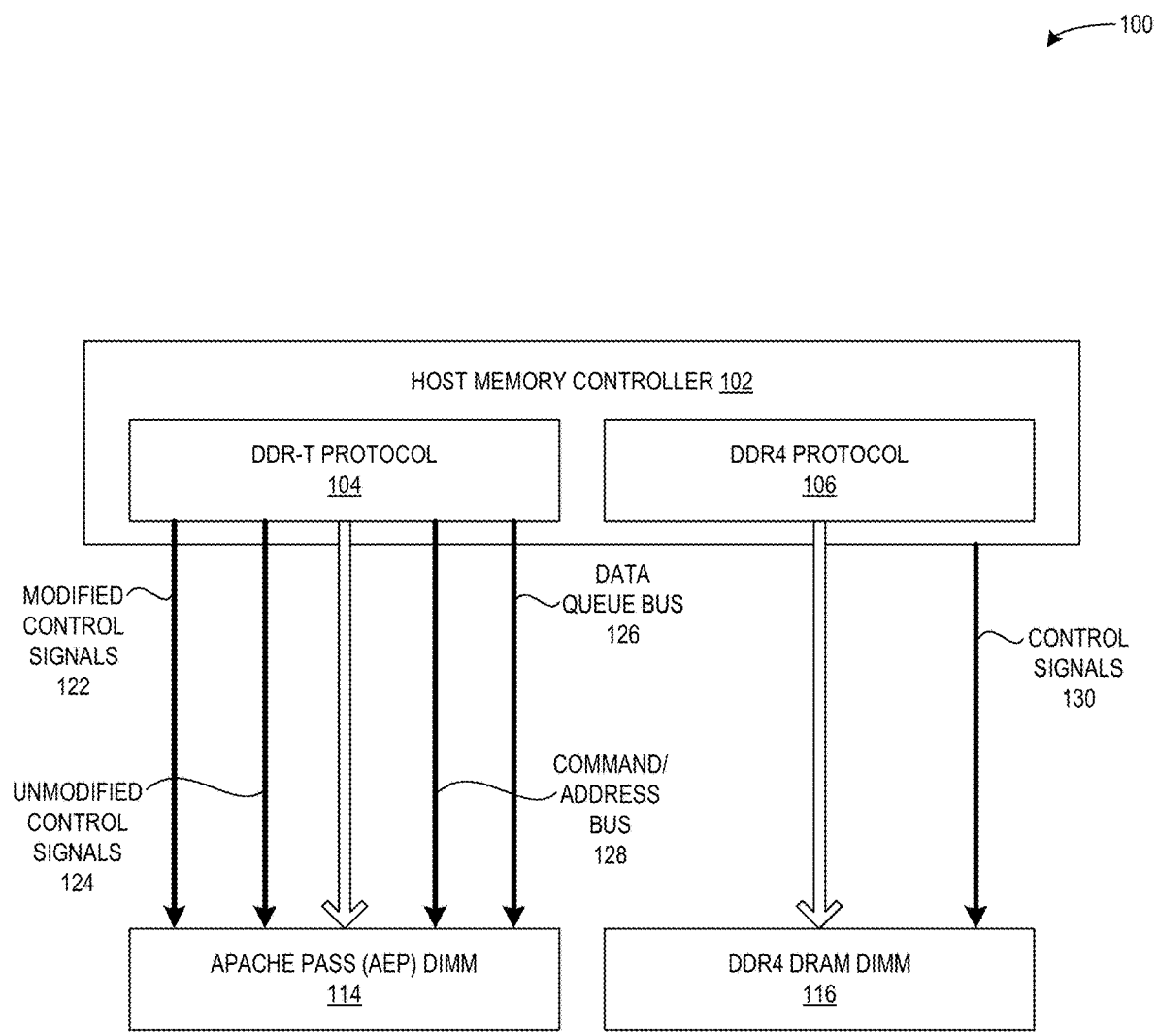
FIG. 1 illustrates a conventional system for data placement which uses the DDR-T protocol, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein facilitate data placement in high-capacity system memory adaptive to a high-error-rate and low-endurance, high-density memory media.

As described above, current performance-critical applications continue to require a large amount of data loaded in the system memory for fast access. However, extending the memory (e.g., to a RAM) to properly serve these applications can be limited by the current storage density of DRAM. For example, a current DRAM DIMM (volatile memory) can have a maximum capacity of 256 GB, while a storage drive such as an SSD (non-volatile memory) with similar dimensions as the DRAM DIMM can have a maximum capacity of 4 TB. This imbalance—specifically, the limited capacity of system memory—can result in frequent page swapping between the system memory and the storage drive, which in turn can slow down processing and reduce the effectiveness and efficiency of the overall system performance.

At the same time, new-generation memory (e.g., ReRAM, PCM, and MRAM) can include a higher fabrication density (capacity), but may result in raw error rates which are higher than the errors rate associated with DRAM. The high error rates of the new-generation memory may cause a burden on the existing architecture of the CPU and system memory. That is, the existing architecture may maintain only a weak error correction, which can create challenges in filling the memory cache line while also ensuring a sufficiently low error rate.

One current technique for data placement is the Apache Pass (AEP) memory system, which uses the DDR-T protocol to handle the media timing. However, the AEP memory system has several limitations, including: a specific CPU; a limited number of memory slots; overprovisioning of unnecessary CPU and system resources; a black box due to the specific processor and the DDR-T protocol; and a high write amplification, as described below in relation to FIG. 1.

The embodiments of the present application address the challenges involved in the current techniques of data placement in a high-capacity system memory and a high-density memory media. The described embodiments provide a system which includes a controller that bridges the memory media with the performance-critical applications. The controller can also handle address mapping to mitigate the write amplification and the high error rate associated with the high-density new-generation media (such as ReRAM, PCM, and MRAM).

The described system uses address mapping by combining an "aligned mapping" and a "misaligned mapping." An aligned mapping can refer to: placing incoming data into a new row with valid data copied out from other rows to create a new user portion; generating a new parity based on the new user portion to create a new ECC parity; and writing the entire ECC codeword, including the new user portion and the new ECC parity, to the new row. In contrast, a misaligned mapping can refer to, given an entire ECC codeword with a corresponding ECC parity: placing portions of the entire ECC codeword into multiple rows; placing the corresponding ECC parity into the same row as the first portion of the ECC codeword; and using a mapping table in a "linked" manner to determine the non-consecutive virtual memory addresses of the portions of the codeword. In some embodiments, the system can use aligned mapping to select the row for the first portion of the ECC codeword, e.g., to allocate the first user portion of data and the ECC parity for the ECC codeword.

The combination of aligned mapping and misaligned mapping is thus not constrained by the category or unit of an ECC codeword and can thus mitigate the write amplification inherent in current techniques. The system described herein can also manipulate data at a finer granularity before writing the data (i.e., data placement), which can result in a more flexible organization of physical locations in a high-density memory array. An exemplary system which facilitates data placement in a high-capacity system memory and a high-density memory is described below in relation to FIG. 2, while examples of aligned mapping and misaligned mapping are described below in, respectively, FIGS. 3 and 4. Using the mapping table in a linked manner is described below in relation to FIG. 5.

Thus, by using aligned mapping and misaligned mapping with the mapping table in a linked manner, the embodiments of the system described herein can result in a reduced write amplification and fewer internal data copy operations. The system can provide efficient data placement in a high-capacity system memory and a high-density memory media, which can achieve low-latency data access of data stored in the high-density memory media. The system can therefore achieve a similar advancement and maturity as the DRAM industry before the fabrication of the new-generation media reaches the same level. By combining the aligned mapping and the misaligned mapping, the system does not need to follow the conventional constraints of the ECC codeword category (e.g., re-programming the entire ECC codeword when only a portion of the codeword needs to be updated). Furthermore, the manipulation of data at a finer granularity can result in a more efficient and improved overall system.

Exemplary System in the Prior Art

FIG. 1 illustrates a conventional system 100 for data placement which uses the DDR-T protocol, in accordance with the prior art. Conventional system 100 can include a host memory controller 102, a specific DIMM (such as an Apache Pass (AEP) DIMM) 114, and a DDR4 DRAM DIMM 116. Host memory controller 102 can include interfaces for two different protocols, including a DDR-T protocol 104 and a DDR4 protocol. Various data can be sent via these protocols. For example, modified control signals 122 and unmodified control signals 124 may be sent from host memory controller 102 to AEP DIMM 114 via DDR-T protocol 104. In addition, data can be sent from host memory controller 102 to AEP DIMM 114 via a data queue bus 126 and a command/address bus 128. Control signals 130 may be sent from host memory controller 102 to DDR4 DRAM DIMM 116 via DDR4 protocol 106.

However, conventional system 100 (or AEP system 100) can include several limitations. First, the AEP system requires a specific Intel CPU, e.g., the latest version Intel CPU. As a result, servers which are deployed with other CPU models cannot be compatible with the AEP system. This can limit the flexibility and adaptability of the AEP system. Second, DDR-T protocol 104 requires a special DIMM slot which is different from the DRAM DIMM slots. The AEP system therefore limits the number of AEP DIMM which can be installed, which can further limit the system memory capacity and the overall throughput.

Third, placing the DDR-T hardware inside the CPU socket can increase both the CPU cost and power consumption, yet the CPU may not always need to use the AEP DIMM. This overprovisioning can decrease the efficiency of the performance and the overall system. Fourth, the entire DDR-T can be viewed as a black box, in that it is not available or open to multiple sources because it relies on a specific processor and protocol. This can limit the flexibility, modularity, and overall adaptability of the AEP system.

Fifth, in order to address the high raw error rate of the new-generation media, the AEP system uses a strong error correction code (ECC). However, a strong ECC can result in a high write amplification, because the granularity of an I/O request (e.g., 64 Bytes) may be small in comparison to the size of the ECC codeword (e.g., 512 Bytes). When writing a small I/O update to a larger ECC codeword, the system must read out the entire ECC codeword, write back the given updated portion to obtain updated user data, generate a new ECC parity, and write both the updated user data and the new ECC parity (e.g., the entire updated ECC codeword) to the memory media. Thus, the entire codeword must be re-programmed when part of the codeword is updated. This write amplification can result in endurance and stability issues. That is, the conventional system can result in a reduced life span (low-endurance media) as well as a decreased efficiency (performance stability).

Figure 2:
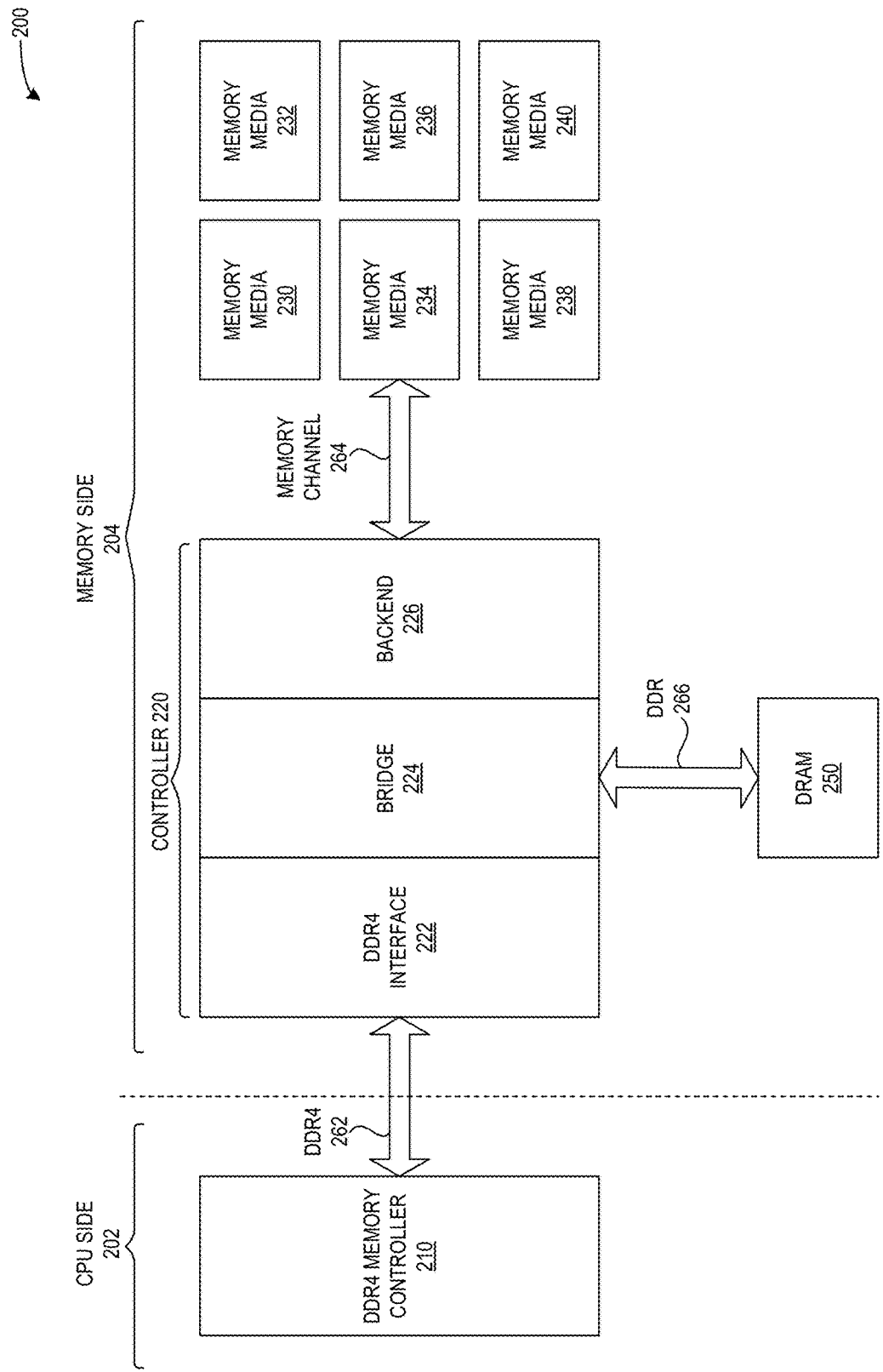
FIG. 2 illustrates an exemplary system including a high-capacity system memory and a high-density memory media, in accordance with an embodiment of the present application.

Exemplary System for Facilitating Data Placement in a High-Capacity System Memory and a High-Density Memory Media FIG. 2 illustrates an exemplary system 200 including a high-capacity system memory and a high-density memory media, in accordance with an embodiment of the present application. System 200 can include a CPU side 202 and a memory side 204. CPU side 202 can include a DDR4 memory controller 210. Memory side 204 can be an apparatus, and can include a controller 220, an internal DRAM 250, and memory media 230-240. Controller 220 can include: a DDR4 interface 222; a bridge 224; and a backend 226. DDR4 interface 222 can communicate with DDR4 memory controller 210 via a DDR4 262 protocol. Bridge 224 can manage data placement and address translation, and can also include a DDR interface (not shown) via which to communicate with DRAM 250 via a DDR 266 protocol. DRAM 250 can store information relating to the address translation as well as buffered data.

Backend 226 can include an interface (not shown) for connecting to memory media 230-240 via a memory channel 264. The memory interface of backend 226 and memory channel 264 can be based on any media protocol which is consistent with the characteristics of memory media 230-240. The low-level protocol of memory channel 264 is not visible to the CPU and any applications. Backend 226 can also perform error correction code (ECC) encoding (and decoding), which can ensure the data quality by controlling the uncorrectable bit error rate (UBER), e.g., by maintaining the UBER at a low level, such as $10^{-15}$ or beyond. This allows the cache line to select the error-free data with a sufficient number of selection candidates and a sufficient efficiency to meet the requirement of the high-throughput.

Controller 220 can be a controller unit, which comprises: a first interface (DDR4 interface 222) for communicating with a host; a second interface for communicating with a DRAM module (an interface to DRAM 250); a third interface for communicating via memory channel 264 with non-volatile memory (memory media 230-240); bridge module 224; and backend module 226. Controller unit 220 can be configured to perform the operations described herein, including the following operations. Controller unit 220 can receive, via DDR4 interface 222, a request to write a first piece of data to the non-volatile memory. Controller unit 220 can encode, by backend 226 based on an error correction code (ECC), the first piece of data to obtain a first ECC codeword which includes a plurality of ordered parts and a first parity. Controller unit 220 can write, via the third interface, the plurality of ordered parts in multiple rows of the non-volatile memory. Controller unit 220 can write, via the third interface, the first parity to a same row in which a starting ordered part is written. Controller unit 220 can update, by bridge 224 in a data structure, entries associated with the ordered parts. A respective entry indicates: a virtual address associated with a respective ordered part, a physical address at which the respective ordered part is written, and an index corresponding to a virtual address associated with a next ordered part; and a first entry associated with the starting ordered part further indicates a physical address at which the first parity is written.

Figure 3:
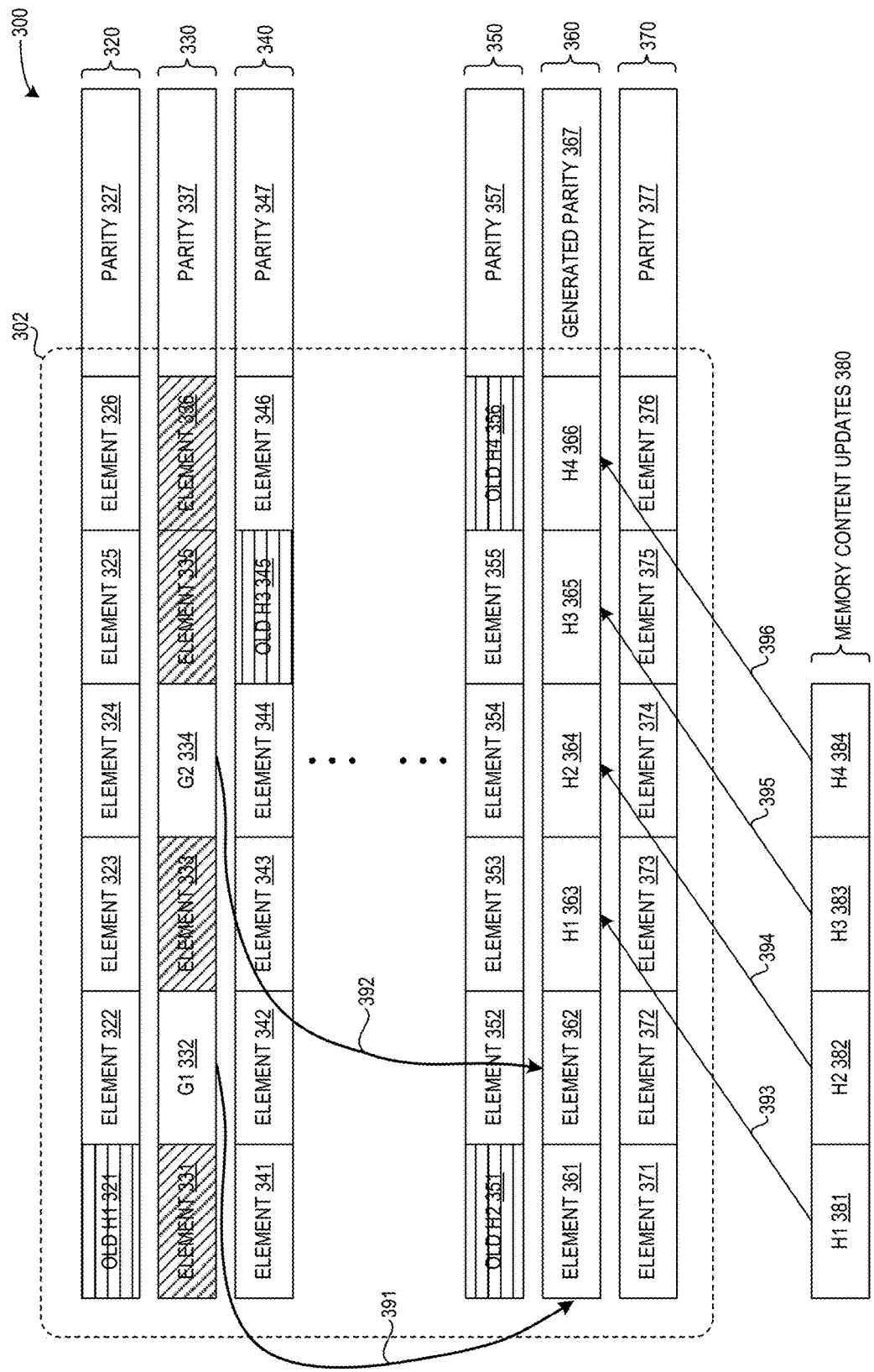
FIG. 3 illustrates a diagram of data placement, including updating the content of memory, re-generating parity for a new row, and aligned mapping, in accordance with an embodiment of the present application.

Exemplary Data Placement: Updating Memory Content; Regenerating Parity; and Aligned Mapping FIG. 3 illustrates a diagram 300 of data placement, including updating the content of memory, re-generating parity for a new row, and aligned mapping, in accordance with an embodiment of the present application. Diagram 300 can include multiple rows in a memory media, such as rows 320, 330, 340, 350, 360, and 370. Each row can store an ECC codeword (including the corresponding ECC parity) in the physical location with a zoned division. For example, row 340 can include: a user data portion (which includes an element 341, an element 342, an element 343, an element 344, an Old H3 345, and an element 346); and a parity 347 which corresponds to the user data portion. Furthermore, a box 302 can indicate all of the user data portions from each of the depicted rows in the memory media.

Old or expired data is indicated with shading in either vertical lines or diagonally right-slanting lines. For example, the following portions, elements, or parts of the stored or written data indicate old or expired data with shading in diagonally right-slanting lines: elements 331, 333, 335, and 336 in row 330. Furthermore, the following portions, elements, or parts of the stored or written data indicate old or expired data with shading in vertical lines: Old H1 321 in row 320; Old H3 345 in row 340; and Old H2 351 and Old H4 356 in row 350.

During operation, the system can receive a request to write data, which can include memory content updates 380, including the following elements: H1 381; H2 382; H3 383; and H4 384. Each of these elements can be an updated version of data which has been previously written (e.g., former data) the memory media. Rather than doing an in-place overwrite, the system can mark these old or former elements as "expired" or "old" or "invalid" (e.g., as indicated by the shading of the vertical lines and the marking as: Old H1 321 in row 320; Old H3 345 in row 340; and Old H2 351 and Old H4 356 in row 350). The system can also identify a codeword with a small number of valid parts (e.g., a row with a number of valid parts less than a predetermined number), and can copy out those valid parts to form a complete user portion with the incoming data (e.g., memory content updates 380).

For example, the system can identify row 330 as a row with a number of valid parts less than a predetermined number (e.g., the number of valid parts is two, which is less than the predetermined number of, e.g., three). The system can also identify a new row (e.g., a row 360 with sufficient space to store a new codeword, including the parity). The system can copy out the valid parts of row 330 (G1 332 and G2 334) to form a complete user portion with all of memory content updates 380 (i.e.: H1 381; H2 382; H3 383; and H4 384). These elements (G1, G2, H1, H2, H3, and H4) can be referred to as the "complete user portion." The ECC encoder (e.g., described above as residing in backend 226 of system 200) can generate the ECC parity for the complete user portion to obtain a generated parity 367. The controller can then write both the complete user portion and generated parity 367 to row 360.

The complete user portion of the data in row 360 is indicated as being placed in row 360 via various communications (depicted as arrows). For example, the system can write or place G1 332 and G2 334 via, respectively, operations 391 and 392, to row 360. The system can also write or place all of memory content updates 380 (i.e., H1 381, H2 382, H3 383, and H4 384) in row 360, as H1363, H2 364, H3 365, and H4 366 via, respectively, operations 393, 394, 395, and 396. Note that the complete user portion may be held temporarily in a data buffer in the DRAM of the controller as part of the controller processes and as part of the ECC encoding process. Communications 391-396 are depicted to illustrate the general movement and placement of data, and do not limit the communications of the embodiments described herein.

Figure 4:
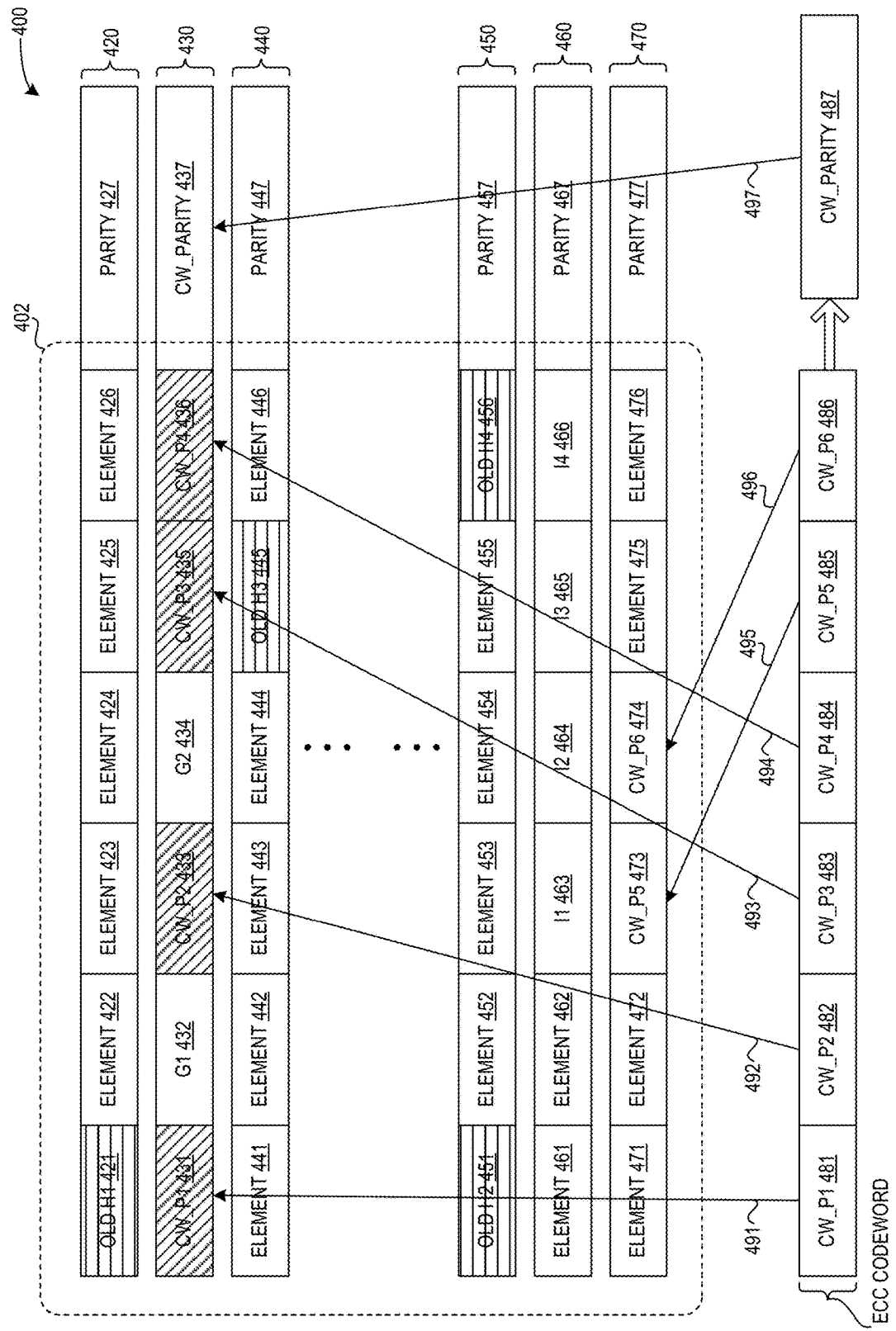
FIG. 4 illustrates a diagram of data placement, including placing an ECC codeword across multiple rows, placing the ECC codeword parity, and misaligned mapping, in accordance with an embodiment of the present application.

Because the complete user portion is aligned in a row in the manner described above to form a whole ECC codeword, the communications of diagram 300 can be referred to as "aligned mapping." The system can also use "misaligned mapping" to further reduce the write amplification, as described below in relation to FIG. 4.

Exemplary Data Placement: Placing an ECC Codeword and the Parity; and Misaligned Mapping FIG. 4 illustrates a diagram 400 of data placement, including placing an ECC codeword across multiple rows, placing the ECC codeword parity, and misaligned mapping, in accordance with an embodiment of the present application. Similar to diagram 300 of FIG. 3, diagram 400 can include multiple rows in a memory media, such as rows 420, 430, 440, 450, 460, and 470. As in diagram 300, old or expired data is indicated with shading in either vertical lines or diagonally right-slanting lines. For example, the following portions, elements, or parts of the stored or written data indicate old or expired data with shading in diagonally right-slanting lines: elements 431, 433, 435, and 436 in row 430. Furthermore, the following portions, elements, or parts of the stored or written data indicate old or expired data with shading in vertical lines: Old H1 421 in row 420; Old H3 445 in row 440; and Old H2 451 and Old H4 456 in row 450. Furthermore, a box 402 can indicate all of the user data portions from each of the depicted rows in the memory media.

However, unlike in diagram 300, where each row can store an ECC codeword (including the corresponding ECC parity), in diagram 400, each row can store parts of different codewords, and each row can also store a parity which may not correspond to the user portion of the data in the row. This misaligned mapping may be illustrated as follows.

During operation, the system may receive a request to write data, which can include updated data corresponding to data which has previously been written to the memory media. The system can create an ECC codeword, e.g., by encoding the data to obtain an ECC codeword which includes a plurality of ordered parts and a corresponding ECC parity. The system can place or write the parts into physical locations in different multiple rows, and can also write the corresponding parity to the same row in which the very first (i.e., the "starting ordered part") is written. Furthermore, in writing the plurality of parts of the ECC codeword to the multiple rows, the system can directly overwrite the previous versions (e.g., former data) of the updated data, thus avoiding the internal data copy operations described above in relation to FIG. 3 (e.g., via communications 391 and 392).

For example, the system can receive a request to write data, and can create an ECC codeword 480, which includes a plurality of ordered parts 481-486 and a corresponding ECC parity 487: a CW_P1 481; a CW_P2 482; a CW_P3 483; a CW_P4 484; a CW_P5 485; a CW_P6 486; and a corresponding CW_PARITY 487. The system can write the plurality of ordered parts to multiple rows, and can also write the corresponding parity to the same row as the starting ordered part (i.e., CW_P1 481). Specifically, the system can place or write CW_P1 481 in row 430 via a communication 491. The system can write CW_P2 482 in row 430 via a communication 492. The system can write CW_P3 483 in row 430 via a communication 493. The system can write CW_P4 484 in row 430 via a communication 494. The system can write CW_P5 485 (as CW_P5 473) in row 470 via a communication 495. The system can write CW_P6 486 (as CW_P6 476) in row 470 via a communication 496. The system can also write CW_PARITY 487 (as CW_PARITY 437) to row 430. Note that the system can write any of elements 481-486 to a given row by overwriting former data (e.g., CW_P1 481 can overwrite its former version CW_P1 431 in row 430), or by placing any of the elements in a location which is available for data placement.

Given the virtual address for any of the plurality of ordered parts of the ECC codeword 480, the system can subsequently access (i.e., read) stored ECC codeword 480 in its entirety based on a mapping table which stores the mapping information in a linked fashion, as described below in relation to FIG. 5.

Exemplary Data Structure for Misaligned Mapping

Figure 5:
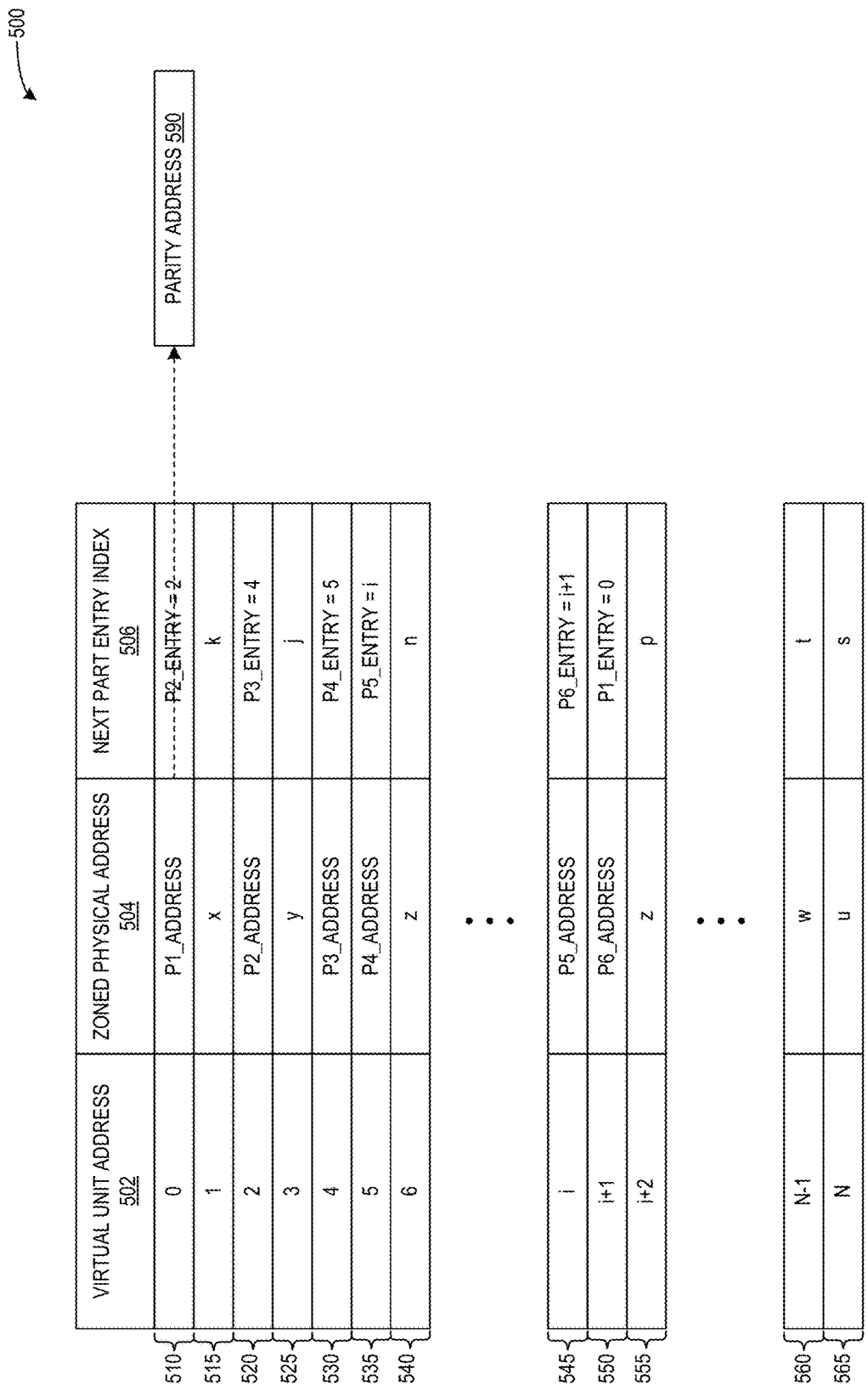
FIG. 5 illustrates an exemplary data structure for misaligned mapping, with entries which map virtual memory to physical memory in a linked manner, in accordance with an embodiment of the present application.

FIG. 5 illustrates an exemplary data structure 500 for misaligned mapping, with entries which map virtual memory to physical memory in a linked manner, in accordance with an embodiment of the present application. Data structure 500 can include entries (such as entries 510, 515, 520, 525, 530, 535, 540, 545, 550, 555, 560, and 565) with the following columns or fields: a virtual unit address 502; a zoned physical address 504; and a next part entry index 506.

For example, an entry 510 can include the following information: a virtual address associated with a respective ordered part, with a value of "0"; a zoned physical address at which the respective ordered part is written, with a value of "P1_ADDRESS"; and a next part entry index corresponding to a virtual address associated with a next ordered part, with a value of "P2_ENTRY=2." In addition, because entry 510 is associated with the first ordered part of a codeword (as indicated by the virtual address and the "P1_ADDRESS" value for the zoned physical address), entry 510 can also store the physical address at which the corresponding parity is stored or written (i.e., for the parity corresponding to the entire codeword to which this first ordered part belongs). An example of reading the data in a linked fashion is provided below in relation to FIG. 6.

Exemplary Read Operation

Figure 6:
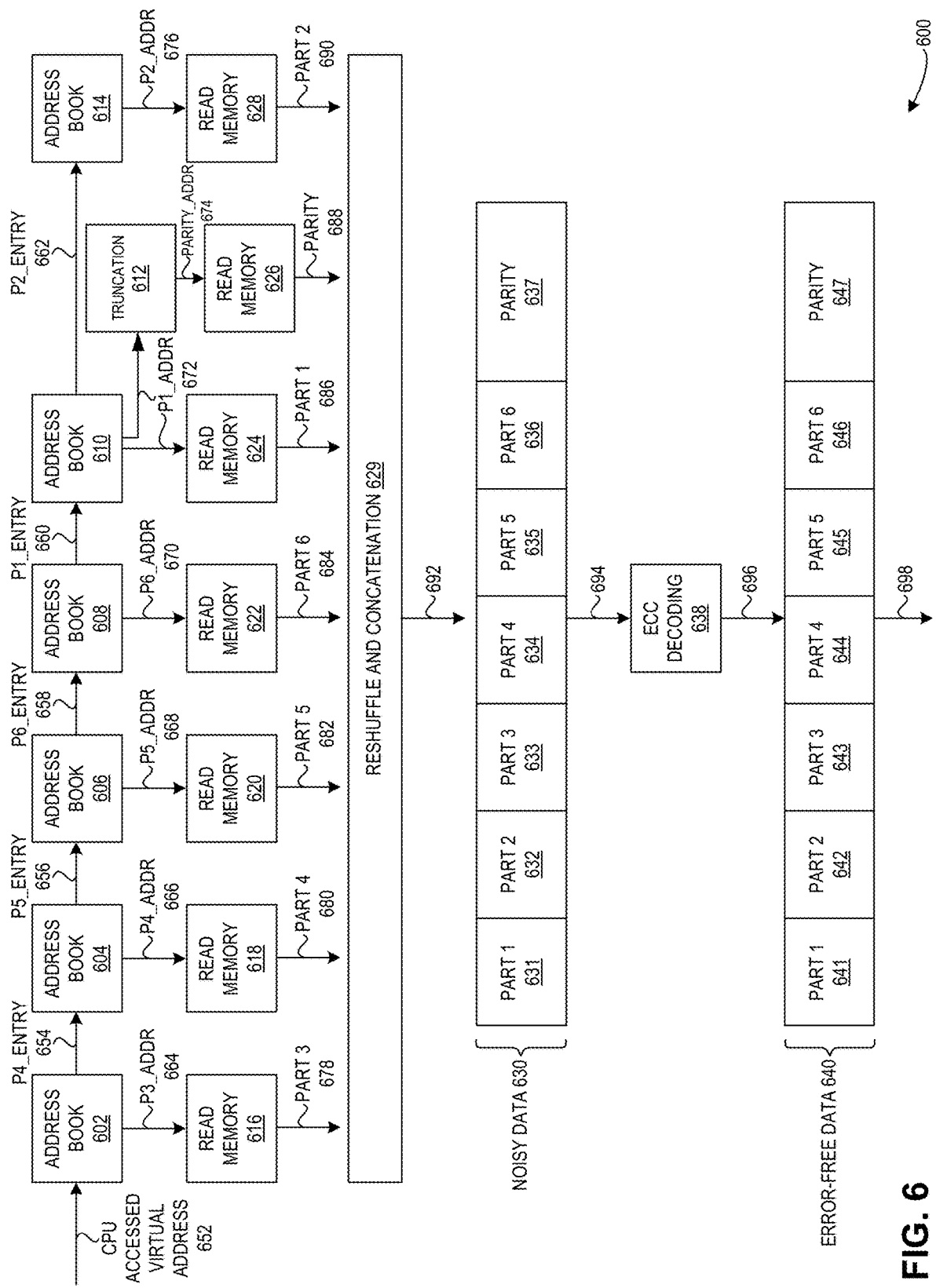
FIG. 6 illustrates a diagram of an exemplary read operation corresponding to data stored in the data structure of FIG. 5, in accordance with an embodiment of the present application.

FIG. 6 illustrates a diagram 600 of an exemplary read operation corresponding to data stored in the data structure of FIG. 5, in accordance with an embodiment of the present application. During operation, the system can receive a request to read a portion of data from a non-volatile memory. The system can receive from a host a virtual address associated with an ordered part of an ECC codeword (via a CPU accessed virtual address 652), and perform a lookup in an address book 602 (also depicted as address books 604, 606, 608, 610, and 614) to obtain the physical address at which the respective ordered part is written and the index corresponding to the virtual address associated with the next ordered part. The system can read the respective ordered part from the obtained physical address, and the system can also use the obtained index to find the entry corresponding to the next ordered part, and repeat the same process until the system has retrieved or read the entire codeword (e.g., all of the ordered parts and the corresponding parity).

In this example, the virtual address received indicates a value of "4," which the system can use to perform a search in address book 602 for a corresponding entry 530 with a physical address of "P3_ADDRESS" and a next part entry index of "P4_ENTRY=5." The system reads the value from the location at the physical address of "P3_ADDRESS" (i.e., P3_ADDR 664) to obtain PART 3 678 (via a read memory 616) and also determines that the virtual address of the next part "P4" is "5" (i.e., P4_ENTRY 654).

Using this determined virtual address of "5" (i.e., P4_ENTRY 654), the system performs a lookup in address book 604 for a corresponding entry 535 with a physical address of "P4_ADDRESS" and a next part entry index of "P5_ENTRY=i." The system reads the value from the location at the physical address of "P4_ADDRESS" (i.e., P4_ADDR 666) to obtain PART 4 680 (via a read memory 618) and also determines that the virtual address of the next part "P5" is "i" (i.e., P5_ENTRY 656).

Using this determined virtual address of "i" (i.e., P5_ENTRY 656), the system performs a lookup in address book 606 for a corresponding entry 545 with a physical address of "P5_ADDRESS" and a next part entry index of "P6_ENTRY=i+1." The system reads the value from the location at the physical address of "P5_ADDRESS" (i.e., P5_ADDR 668) to obtain PART 5 682 (via a read memory 620) and also determines that the virtual address of the next part "P6" is "i+1" (i.e., P6_ENTRY 658).

Using this determined virtual address of "i+1" (i.e., P6_ENTRY 658), the system performs a lookup in address book 608 for a corresponding entry 550 with a physical address of "P6_ADDRESS" and a next part entry index of "P1_ENTRY=0." The system reads the value from the location at the physical address of "P6_ADDRESS" (i.e., P6_ADDR 670) to obtain PART 6 684 (via a read memory 622) and also determines that the virtual address of the next part "P1" is "0" (i.e., P1_ENTRY 660).

Using this determined virtual address of "0" (i.e., P1_ENTRY 660), the system performs a lookup in address book 610 for a corresponding entry 510 with a physical address of "P1_ADDRESS" and a next part entry index of "P2_ENTRY=2." The system reads the value from the location at the physical address of "P1_ADDRESS" (i.e., P1_ADDR 672) to obtain PART 1 686 (via a read memory 624) and also determines that the virtual address of the next part "P2" is "2" (i.e., P2_ENTRY 662). Furthermore, because this entry 510 is the starting ordered part of this piece of data, the system also uses P1_ADDR 672 to perform a truncation 612, which yields or returns a PARITY_ADDR 674 that corresponds to the requested piece of data. The system reads the value from the location at the physical address of "PARITY ADDRESS 590" to obtain a PARITY 688 (via a read memory 626).

Using the determined virtual address of "2" (i.e., P2_ENTRY 662), the system performs a lookup in address book 614 for a corresponding entry 520 with a physical address of "P2_ADDRESS" and a next part entry index of "P3_ENTRY=4." The system reads the value from the location at the physical address of "P2_ADDRESS" (i.e., P2_ADDR 676) to obtain PART 2 690 (via a read memory 628) and also determines that the virtual address of the next part "P3" is "4." The system can determine that there are no more ordered parts to be read of the requested piece of data, because the next virtual address "4" matches the same CPU accessed virtual address 652 as initially received by the system to perform its first lookup (as described above in relation to address book 602 and read memory 616).

Thus, the system can traverse through the mapping table in this linked manner until it obtains all the ordered parts (e.g., part 3 678, part 4 680, part 5 682, part 6 684, part 1 686, and part 2 690) of the requested piece of data as well as the corresponding parity (e.g., parity 688). The system can reshuffle and concatenate all the ordered parts and the parity (via a reshuffle and concatenation module 629) to obtain the originally stored ECC codeword (e.g., after a communication 692 as noisy data 630). Noisy data 630 can include, in the following reshuffled and concatenated order: a part 1 631; a part 2 632; a part 3 633; a part 4 634; a part 5 635; a part 6 636; and a parity 637. Subsequently, the system can send noisy data 630 to an ECC decoding module 638, via a communication 694, to be decoded based on the error correction code (ECC). ECC decoding module 638 can decode noisy data 630 to obtain the requested data, and can send the requested data, via a communication 696, as error-free data 640. Error free data 640 can include: a part 1 641; a part 2 642; a part 3 643; a part 4 644; a part 5 645; a part 6 646; and a parity 647. The system can return, via a communication 698, the requested portion of the piece of data (part 3 643) or the entire piece of data (parts 1-6 641-646).

Note that address books 602-614 are depicted as separate entities for the sake of clarity, but the search is performed in the same address book, e.g., the data structure 500 of FIG. 5. Furthermore, note that read memory 616-628 are also depicted as separate entities or operations for the sake of clarity, but the read operation is performed on the memory media, e.g., memory media 230-240 of FIG. 2.

Exemplary Method for Reshaping Power Budget of a Server Cabinet

Figure 7A:
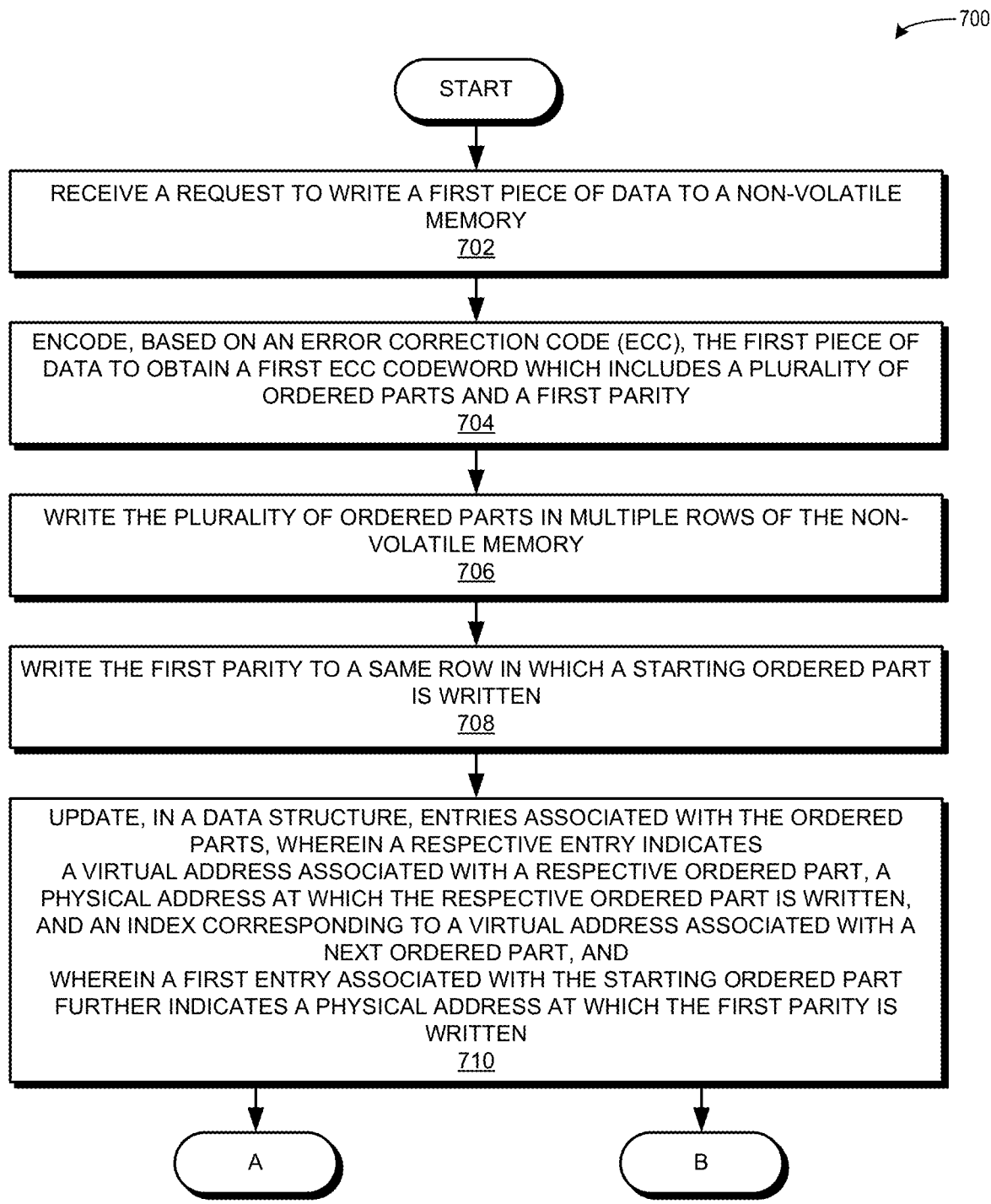
FIG. 7A presents a flowchart illustrating a method for facilitating data placement in a high-capacity system memory and a high-density memory media, including a misaligned mapping, in accordance with an embodiment of the present application.

FIG. 7A presents a flowchart 700 illustrating a method for facilitating data placement in a high-capacity system memory and a high-density memory media, including a misaligned mapping, in accordance with an embodiment of the present application. During operation, the system receives a request to write a first piece of data to a non-volatile memory (operation 702). The system encodes, based on an error correction code (ECC), the first piece of data to obtain a first ECC codeword which includes a plurality of ordered parts and a first parity (operation 704). The system writes the plurality of ordered parts in multiple rows of the non-volatile memory (operation 706). The system writes the first parity to a same row in which a starting ordered part is written (operation 708). The system updates, in a data structure, entries associated with the ordered parts, wherein a respective entry indicates: a virtual address associated with a respective ordered part, a physical address at which the respective ordered part is written, and an index corresponding to a virtual address associated with a next ordered part, and wherein a first entry associated with the starting ordered part further indicates a physical address at which the first parity is written (operation 710). The operation can continue at either Label A or Label B as described below in relation to, respectively, FIGS. 7B and 7C.

Figure 7B:
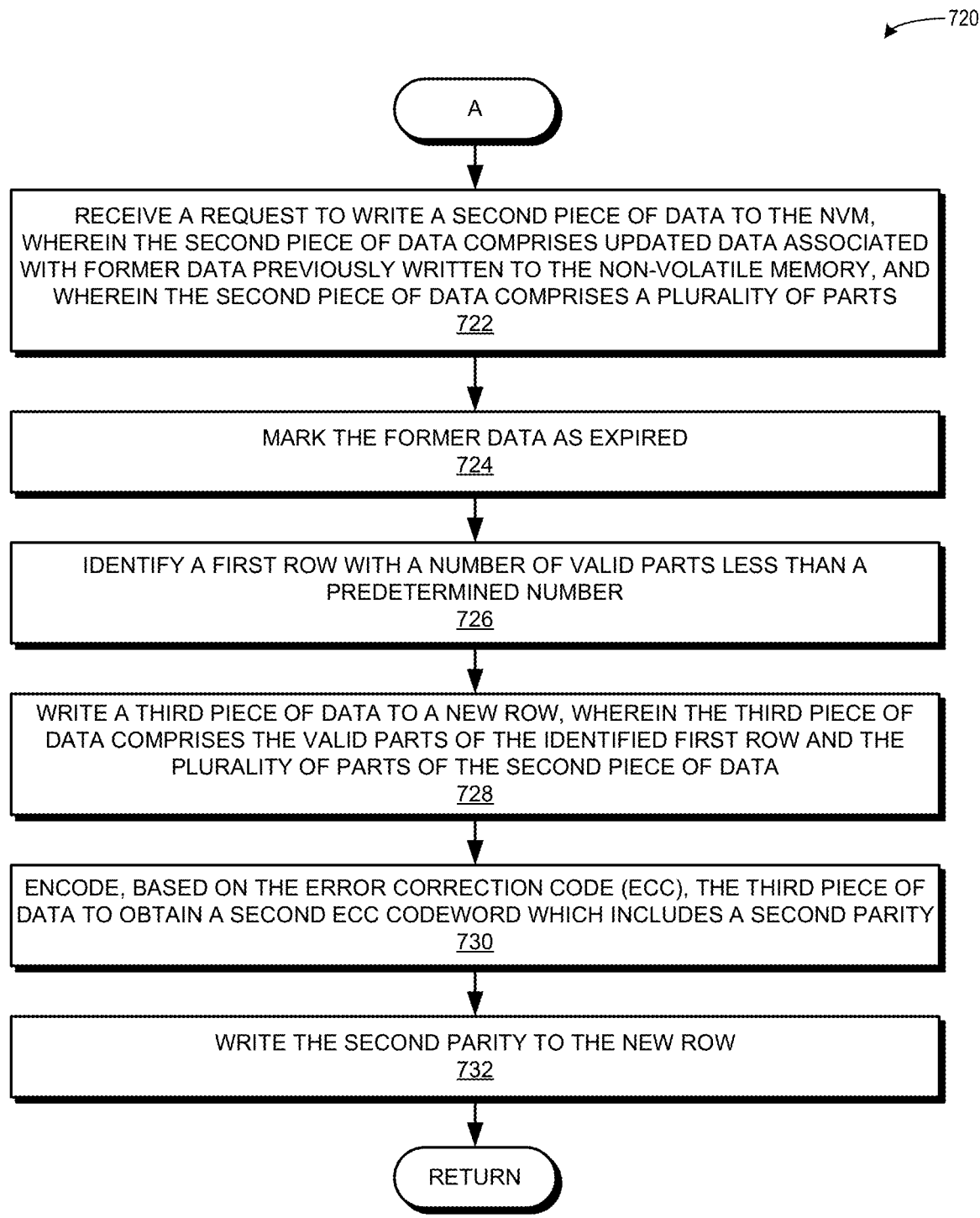
FIG. 7B presents a flowchart illustrating a method for facilitating data placement in a high-capacity system memory and a high-density memory media, including an aligned mapping, in accordance with an embodiment of the present application.

FIG. 7B presents a flowchart 720 illustrating a method for facilitating data placement in a high-capacity system memory and a high-density memory media, including an aligned mapping, in accordance with an embodiment of the present application. During operation, the system receives a request to write a second piece of data to the non-volatile memory (NVM), wherein the second piece of data comprises updated data associated with former data previously written to the non-volatile memory, and wherein the second piece of data comprises a plurality of parts (operation 722). The system subsequently writes the second piece of data to the non-volatile memory, based on the following operations. The system marks the former data as expired (operation 724). The system identifies a first row with a number of valid parts less than a predetermined number (operation 726). The system writes a third piece of data to a new row, wherein the third piece of data comprises the valid parts of the identified first row and the plurality of parts of the second piece of data (operation 728). The system encodes, based on the error correction code (ECC), the third piece of data to obtain a second ECC codeword which includes a second parity (operation 730). The system writes the second parity to the new row (operation 732).

Figure 7C:
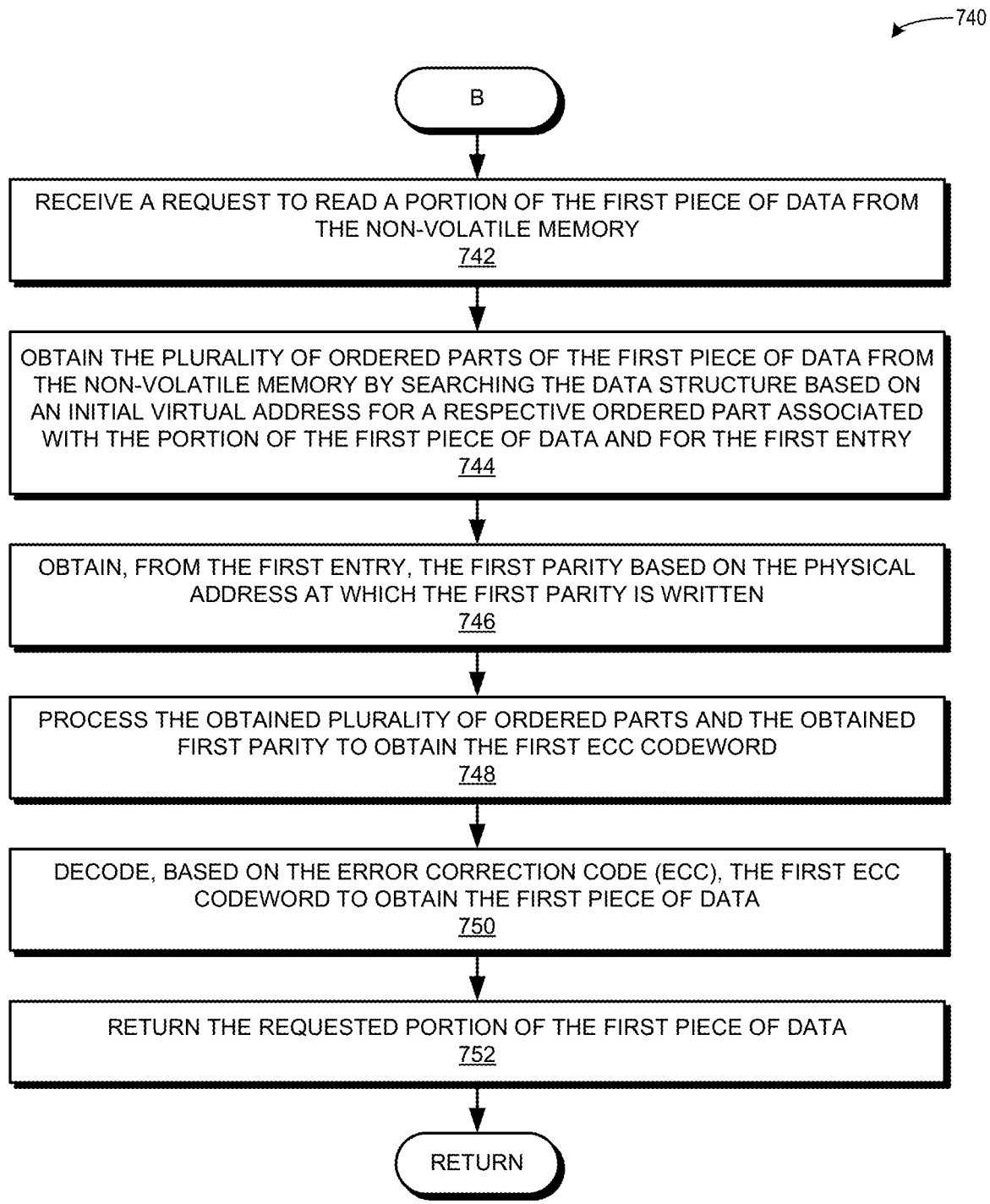
FIG. 7C presents a flowchart illustrating a method for reading data which has been stored in a high-capacity system memory and a high-density memory media, in accordance with an embodiment of the present application.

FIG. 7C presents a flowchart 740 illustrating a method for reading data which has been stored in a high-capacity system memory and a high-density memory media, in accordance with an embodiment of the present application. During operation, the system receives a request to read a portion of the first piece of data from the non-volatile memory (operation 742). The system obtains the plurality of ordered parts of the first piece of data from the non-volatile memory by searching the data structure based on an initial virtual address for a respective ordered part associated with the portion of the first piece of data and for the first entry (operation 744). The system obtains, from the first entry, the first parity based on the physical address at which the first parity is written (operation 746).

The system processes the obtained plurality of ordered parts and the obtained first parity to obtain the first ECC codeword (operation 748). To process the ordered parts and the first parity, the system can truncate, from the first entry, the physical address at which the starting ordered part is written to obtain the physical address at which the first parity is written, as described above in FIG. 6 in relation to address book 610, P1_ADDR 672, truncation 612, PARITY_ADDR 674, read memory 626, and PARITY 688. The system can reshuffle the ordered parts and the parity, and can also concatenate the reshuffled parts and parity to obtain the ECC codeword, as described above in FIG. 6 in relation to reshuffle and concatenation module 629, communication 692, and noisy data 630.

The system decodes, based on the error correction code (ECC), the first ECC codeword to obtain the first piece of data (operation 750). The system can also use the obtained first parity to confirm the consistency of the decoded first ECC codeword (not shown). The system returns the requested portion of the first piece of data (operation 752).

Figure 7D:
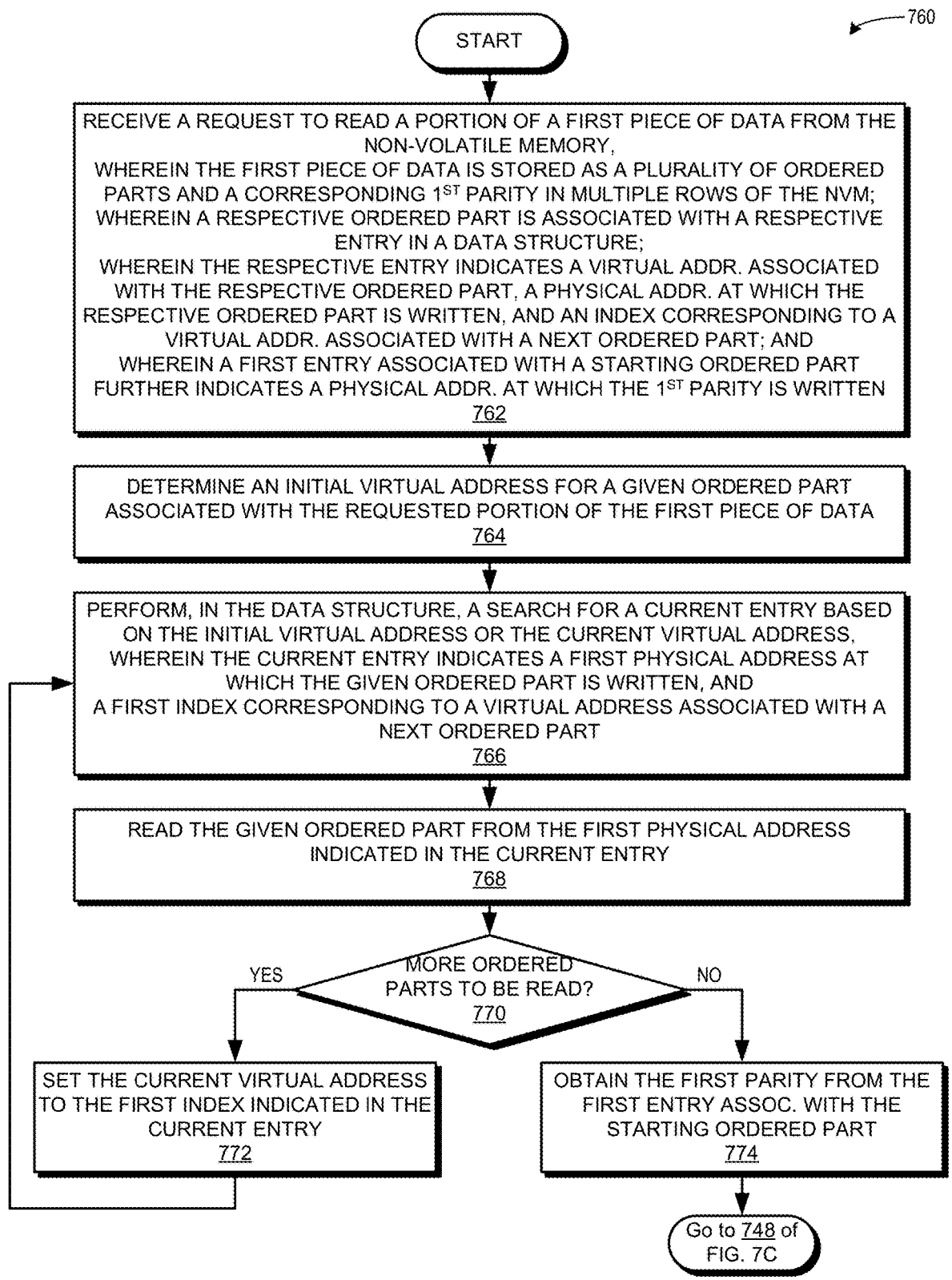
FIG. 7D presents a flowchart illustrating a method for reading data which has been stored in a high-capacity system memory and a high-density memory media, including traversing a mapping table or data structure, in accordance with an embodiment of the present application.

FIG. 7D presents a flowchart 760 illustrating a method for reading data which has been stored in a high-capacity system memory and a high-density memory media, including traversing a mapping table or data structure, in accordance with an embodiment of the present application. During operation, the system receives a request to read a portion of a first piece of data from the non-volatile memory, wherein the first piece of data is stored as a plurality of ordered parts and a corresponding first parity in multiple rows of the non-volatile memory (NVM); wherein a respective ordered part is associated with a respective entry in a data structure; wherein the respective entry indicates a virtual address associated with the respective ordered part, a physical address at which the respective ordered part is written, and an index corresponding to a virtual address associated with a next ordered part; and wherein a first entry associated with a starting ordered part further indicates a physical address at which the first parity is written (operation 762). The system determines an initial virtual address for a given ordered part associated with the requested portion of the first piece of data (operation 764). The system performs, in the data structure, a search for a current entry based on the initial virtual address or the current virtual address, wherein the current entry indicates a first physical address at which the given ordered part is written, and a first index corresponding to a virtual address associated with a next ordered part (operation 766). The system reads the given ordered part from the first physical address indicated in the current entry (operation 768). If there are more ordered parts to be read (decision 770), the system sets the current virtual address to the first index indicated in the current entry (operation 772), and the operation continues again at operation 766, as described above. If there are no more ordered parts to be read (decision 770), the system obtains the first parity from the first entry associated with the starting ordered part (operation 774), and the operation continues at operation 748 of FIG. 7C.

Exemplary Computer System

Figure 8:
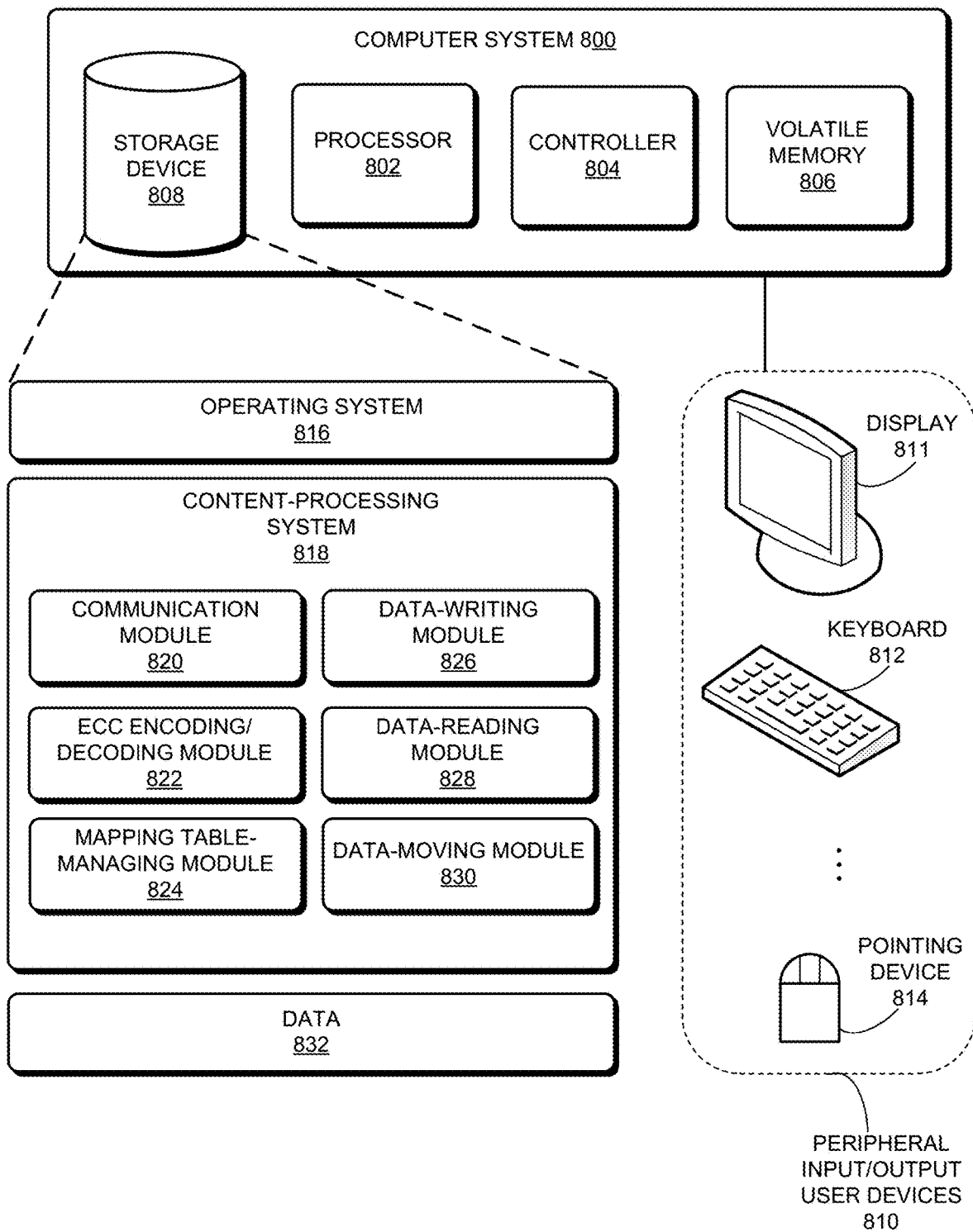
FIG. 8 illustrates an exemplary computer system that facilitates data placement in a high-capacity system memory and a high-density memory media, in accordance with an embodiment of the present application.

FIG. 8 illustrates an exemplary computer system 800 that facilitates data placement in a high-capacity system memory and a high-density memory media, in accordance with an embodiment of the present application. Computer system 800 includes a processor 802, a controller 804, a volatile memory 806, and a storage device 808. Volatile memory 806 can include, e.g., random access memory (RAM), that serves as a managed memory, and can be used to store one or more memory pools. Storage device 808 can include persistent storage which can be managed or accessed via processor 802 or controller 804. Furthermore, computer system 800 can be coupled to peripheral input/output (I/O) user devices 810, e.g., a display device 811, a keyboard 812, and a pointing device 814. Storage device 808 can store an operating system 816, a content-processing system 818, and data 832.

Content-processing system 818 can include instructions, which when executed by computer system 800, can cause computer system 800 to perform methods and/or processes described in this disclosure. Specifically, content-processing system 818 can include instructions for receiving and transmitting data packets, including data to be read or written, an input/output (I/O) request (e.g., a read request or a write request), and data associated with an I/O request (communication module 820).

Content-processing system 818 can further include instructions for receiving a request to write a first piece of data to a non-volatile memory (communication module 820). Content-processing system 818 can include instructions for encoding, based on an error correction code (ECC), the first piece of data to obtain a first ECC codeword which includes a plurality of ordered parts and a first parity (ECC encoding/decoding module 822). Content-processing system 818 can include instructions for writing the plurality of ordered parts in multiple rows of the non-volatile memory (data-writing module 826). Content-processing system 818 can include instructions for writing the first parity to a same row in which a starting ordered part is written (data-writing module 826). Content-processing system 818 can also include instructions for updating, in a data structure, entries associated with the ordered parts (mapping table-managing module 824).

Content-processing system 818 can additionally include instructions for receiving a request to write a second piece of data to the non-volatile memory (communication module 820). Content-processing system 818 can include instructions for writing the second piece of data to the non-volatile memory (data-writing module 826). Content-processing system 818 can include instructions for marking the former data as expired (data-moving module 826). Content-processing system 818 can include instructions for identifying a first row with a number of valid parts less than a predetermined number (data-moving module 830). Content-processing system 818 can also include instructions for writing a third piece of data to a new row, wherein the third piece of data comprises the valid parts of the identified first row and the plurality of parts of the second piece of data (data-writing module 828). Content-processing system 818 can include instructions for encoding, based on the error correction code (ECC), the third piece of data to obtain a second ECC codeword which includes a second parity (ECC encoding/decoding module 824). Content-processing system 818 can include instructions for writing the second parity to the new row (data-writing module 826).

Content-processing system 818 can further include instructions for receiving a request to read a portion of the first piece of data from the non-volatile memory (communication module 820). Content-processing system 818 can include instructions for obtaining the plurality of ordered parts of the first piece of data from the non-volatile memory by searching the data structure based on an initial virtual address for a respective ordered part associated with the portion of the first piece of data and for the first entry (mapping table-managing module 824 and data-reading module 828). Content-processing system 818 can include instructions for obtaining, from the first entry, the first parity based on the physical address at which the first parity is written (mapping table-managing module 824). Content-processing system 818 can also include instructions for processing the obtained plurality of ordered parts and the obtained first parity to obtain the first ECC codeword (data-reading module 828). Content-processing system 818 can include instructions for decoding, based on the error correction code (ECC), the first ECC codeword to obtain the first piece of data (ECC encoding/decoding module 822). Content-processing system 818 can include instructions for returning the requested portion of the first piece of data (communication module 820).

Data 832 can include any data that is required as input or generated as output by the methods and/or processes described in this disclosure. Specifically, data 832 can store at least: data; a piece or a portion of data; a request; a read request; a write request; an input/output (I/O) request; data associated with a read request, a write request, or an I/O request; a codeword; an ECC-encoded codeword; an ECC-decoded codeword; a part of data; an ordered part of data; an ordering; a plurality of parts; an error correction code (ECC); a parity; an ECC parity; a data structure; entries in a data structure; a virtual address; a physical address; an index; a first ordered part; a respective ordered part; former data; a valid part; a row; a new row; a number of valid parts; a predetermined number; an aligned mapping; a misaligned mapping; a truncated address; reshuffled parts of data; concatenated parts of data; and a calculated physical address.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
    receiving a request to write a first piece of data to a non-volatile memory;
    encoding, based on an error correction code (ECC), the first piece of data to obtain a first ECC codeword which includes a plurality of ordered parts and a first parity;
    writing the plurality of ordered parts in multiple rows of the non-volatile memory;
    writing the first parity to a same row in which a starting ordered part is written; and
    updating, in a data structure, entries associated with the ordered parts;
        wherein a respective entry indicates: a virtual address associated with a respective ordered part, a physical address at which the respective ordered part is written, and an index corresponding to a virtual address associated with a next ordered part; and
        wherein a first entry associated with the starting ordered part further indicates a physical address at which the first parity is written.

2. The method of claim 1, wherein writing the plurality of ordered parts comprises:
    determining that at least one of the plurality of ordered parts comprises updated data associated with former data previously written to a first row of the multiple rows;
    writing the at least one of the plurality of ordered parts directly to a same physical location at which the former data is previously written; and
    refraining from copying out any valid parts of the first row to a new row.

3. The method of claim 1, wherein writing the first parity to the same row in which the first ordered part is written comprises:
    replacing a former parity in the same row.

4. The method of claim 1, wherein virtual addresses associated with the ordered parts of the first piece of data are not consecutive.

5. The method of claim 1, further comprising:
    receiving a request to write a second piece of data to the non-volatile memory; and
    writing the second piece of data to the non-volatile memory,
        wherein the second piece of data comprises updated data associated with former data previously written to the non-volatile memory, and
        wherein the second piece of data comprises a plurality of parts.

6. The method of claim 5, wherein writing the second piece of data comprises:
    marking the former data as expired;
    identifying a first row with a number of valid parts less than a predetermined number;
    writing a third piece of data to a new row, wherein the third piece of data comprises the valid parts of the identified first row and the plurality of parts of the second piece of data;
    encoding, based on the error correction code (ECC), the third piece of data to obtain a second ECC codeword which includes a second parity; and
    writing the second parity to the new row.

7. The method of claim 1, further comprising:
    receiving a request to read a portion of the first piece of data from the non-volatile memory;
    obtaining the plurality of ordered parts of the first piece of data from the non-volatile memory by searching the data structure based on an initial virtual address for a respective ordered part associated with the portion of the first piece of data and for the first entry;
    obtaining, from the first entry, the first parity based on the physical address at which the first parity is written;
    processing the obtained plurality of ordered parts and the obtained first parity to obtain the first ECC codeword;
    decoding, based on the error correction code (ECC), the first ECC codeword to obtain the first piece of data; and
    returning the requested portion of the first piece of data.

8. The method of claim 7, wherein processing the obtained plurality of ordered parts and the obtained first parity to obtain the first ECC codeword comprises:
    truncating, from the first entry, the physical address at which the starting ordered part is written to obtain the physical address at which the first parity is written;
    reshuffling the plurality of ordered parts and the obtained first parity; and
    concatenating the reshuffled plurality of ordered parts and the obtained first parity to obtain the first ECC codeword.

9. The method of claim 7, wherein obtaining the plurality of ordered parts of the first piece of data from the non-volatile memory comprises:
    determining an initial virtual address for a respective ordered part associated with the portion of the first piece of data;
    performing, in the data structure, a first search for an initial entry based on the initial virtual address,
        wherein the initial entry indicates: a first physical address at which the respective ordered part is written, and a first index corresponding to a virtual address associated with a next ordered part;
    reading the respective ordered part from the first physical address; and performing, in the data structure, a second search for a next entry based on the first index to obtain a second physical address at which the next ordered part is written and from which to read the next ordered part.

10. The method of claim 7, wherein obtaining the first parity from the first entry further comprises:
calculating the physical address at which the first parity is written by truncating the physical address at which the starting ordered part is written.

11. A computer system, comprising:
a processor; and
a memory coupled to the processor and storing instructions, which when executed by the processor cause the processor to perform a method, the method comprising:
receiving a request to write a first piece of data to a non-volatile memory;
encoding, based on an error correction code (ECC), the first piece of data to obtain a first ECC codeword which includes a plurality of ordered parts and a first parity;
writing the plurality of ordered parts in multiple rows of the non-volatile memory;
writing the first parity to a same row in which a starting ordered part is written; and
updating, in a data structure, entries associated with the ordered parts;
wherein a respective entry indicates: a virtual address associated with a respective ordered part, a physical address at which the respective ordered part is written, and an index corresponding to a virtual address associated with a next ordered part; and
wherein a first entry associated with the starting ordered part further indicates a physical address at which the first parity is written.

12. The computer system of claim 11, wherein writing the plurality of ordered parts comprises:
determining that at least one of the plurality of ordered parts comprises updated data associated with former data previously written to a first row of the multiple rows;
writing the at least one of the plurality of ordered parts directly to a same physical location at which the former data is previously written; and
refraining from copying out any valid parts of the first row to a new row.

13. The computer system of claim 11, wherein writing the first parity to the same row in which the first ordered part is written comprises:
replacing a former parity in the same row.

14. The computer system of claim 11, wherein virtual addresses associated with the ordered parts of the first piece of data are not consecutive.

15. The computer system of claim 11, wherein the method further comprises:
receiving a request to write a second piece of data to the non-volatile memory; and
writing the second piece of data to the non-volatile memory,
wherein the second piece of data comprises updated data associated with former data previously written to the non-volatile memory, and
wherein the second piece of data comprises a plurality of parts.

16. The computer system of claim 15, wherein writing the second piece of data comprises:
marking the former data as expired;
identifying a first row with a number of valid parts less than a predetermined number;
writing a third piece of data to a new row, wherein the third piece of data comprises the valid parts of the identified first row and the plurality of parts of the second piece of data;
encoding, based on the error correction code (ECC), the third piece of data to obtain a second ECC codeword which includes a second parity; and
writing the second parity to the new row.

17. The computer system of claim 11, wherein the method further comprises:
receiving a request to read a portion of the first piece of data from the non-volatile memory;
obtaining the plurality of ordered parts of the first piece of data from the non-volatile memory by searching the data structure based on an initial virtual address for a respective ordered part associated with the portion of the first piece of data and for the first entry;
obtaining, from the first entry, the first parity based on the physical address at which the first parity is written;
processing the obtained plurality of ordered parts and the obtained first parity to obtain the first ECC codeword;
decoding, based on the error correction code (ECC), the first ECC codeword to obtain the first piece of data; and
returning the requested portion of the first piece of data.

18. The computer system of claim 17, wherein processing the obtained plurality of ordered parts and the obtained first parity to obtain the first ECC codeword comprises:
truncating, from the first entry, the physical address at which the starting ordered part is written to obtain the physical address at which the first parity is written;
reshuffling the plurality of ordered parts and the obtained first parity; and
concatenating the reshuffled plurality of ordered parts and the obtained first parity to obtain the first ECC codeword.

19. The computer system of claim 17, wherein obtaining the plurality of ordered parts of the first piece of data from the non-volatile memory comprises:
determining an initial virtual address for a respective ordered part associated with the portion of the first piece of data;
performing, in the data structure, a first search for an initial entry based on the initial virtual address,
wherein the initial entry indicates: a first physical address at which the respective ordered part is written, and a first index corresponding to a virtual address associated with a next ordered part;
reading the respective ordered part from the first physical address; and
performing, in the data structure, a second search for a next entry based on the first index to obtain a second physical address at which the next ordered part is written and from which to read the next ordered part.

20. An apparatus, comprising:
a controller unit, which comprises a first interface for communicating with a host, a second interface for communicating with a volatile memory, a third interface for communicating via a memory channel with a non-volatile memory, a bridge module, and a backend module;
the volatile memory; and
the non-volatile memory;
wherein the controller unit is configured to:
receive, via the first interface, a request to write a first piece of data to the non-volatile memory;
encode, by the backend module based on an error correction code (ECC), the first piece of data to obtain a first ECC codeword which includes a plurality of ordered parts and a first parity;
write, via the third interface, the plurality of ordered parts in multiple rows of the non-volatile memory;
write, via the third interface, the first parity to a same row in which a starting ordered part is written; and
update, by the bridge module in a data structure, entries associated with the ordered parts;
wherein a respective entry indicates: a virtual address associated with a respective ordered part, a physical address at which the respective ordered part is written, and an index corresponding to a virtual address associated with a next ordered part; and
wherein a first entry associated with the starting ordered part further indicates a physical address at which the first parity is written.

* * * * *